US010534344B2

(12) United States Patent
Inoue et al.

(10) Patent No.: US 10,534,344 B2
(45) Date of Patent: Jan. 14, 2020

(54) OPERATION MANAGEMENT SYSTEM AND MEASUREMENT SYSTEM

(71) Applicant: FANUC CORPORATION, Yamanashi (JP)

(72) Inventors: Shogo Inoue, Yamanashi (JP); Takashi Hosaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 15/653,110

(22) Filed: Jul. 18, 2017

(65) Prior Publication Data

US 2018/0024527 A1 Jan. 25, 2018

(30) Foreign Application Priority Data

Jul. 19, 2016 (JP) .................................. 2016-141816

(51) Int. Cl.
*G05B 19/406* (2006.01)

(52) U.S. Cl.
CPC .. *G05B 19/406* (2013.01); *G05B 2219/35257* (2013.01); *G05B 2219/35263* (2013.01); *G05B 2219/37074* (2013.01)

(58) Field of Classification Search
None
See application file for complete search history.

(56) References Cited

U.S. PATENT DOCUMENTS

2013/0345854 A1* 12/2013 Michiwaki ............. G05B 19/18
700/195

FOREIGN PATENT DOCUMENTS

JP  2014002654 A  1/2014

* cited by examiner

*Primary Examiner* — Paul B Yanchus, III
(74) *Attorney, Agent, or Firm* — Hauptman Ham, LLP

(57) ABSTRACT

An operation management system configured to acquire measured values of a workpiece from a numerical controller which controls a machine tool to measure the workpiece is provided with a measurement macro receiving unit configured to read a measurement macro for controlling the measurement from the numerical controller, a measurement macro analysis unit configured to analyze the measurement macro to identify the name of a measurement result variable loaded with the measured values, and a measurement result read-out unit configured to read out the value of the measurement result variable from the numerical controller. The operation management system easily acquires the result of the workpiece measurement from the numerical controller.

7 Claims, 7 Drawing Sheets

| PROGRAM NAME | TRIGGER VARIABLE | MEASUREMENT RESULT VARIABLE | ... |
|---|---|---|---|
| O9876 | #500 | #10030, #10031 | ... |
| O9877 | #501 | #10040, #10041, #10042 | ... |
| ... | ... | ... | ... |

O9876 (MEASURE MACRO) ← PROGRAM NAME OF MEASUREMENT MACRO 21
10030=0.0 (MEASURE RESULT)
10031=0.0 (MEASURE RESULT) ← MEASUREMENT RESULT VARIABLES

X1366.7=1 (PROBE ON)
G0 X[#10001] Y[#10002]
G0 Z[#10100]
G31 X[#10030] Y[#10031] F20.
   :
X1366.7=0 (PROBE OFF)
500=1 (MEASURE END) ← TRIGGER VARIABLE
WHILE [#500NE0]DO1
   :
END 1
M99

OPERATION MANAGEMENT SYSTEM AND MEASUREMENT SYSTEM

RELATED APPLICATIONS

The present application claims priority to Japanese Application Number 2016-141816 filed Jul. 19, 2016, the disclosure of which is hereby incorporated by reference herein in its entirety.

BACKGROUND OF THE INVENTION

Field of the Invention

The present invention relates to an operation management system for collecting measurement data, and more particularly, to an operation management system and a measurement system capable of easily acquiring the result of measurement of a workpiece from a numerical controller.

Description of the Related Art

In recent years, A demand for traceability in processes of workpiece machining by a machine tool has been increased. For example, if the post-machining dimensions of each individual workpiece machined by the machine tool are measured and the measured data is saved in advance, a problematic process can be traced by examining the measured data when the workpiece is found to have a problem afterward.

There is a case in which the workpiece measurement is carried out by means of measuring equipment separate from the machine tool. In order to omit an initial setup process, in contrast, the measurement macro itself may be configured to carry out the machining and measurement. In the latter case, a probe (measuring probe) is typically mounted on the machine tool such that the numerical controller can carry out the measurement by controlling the machine tool according to a macro program for measurement (hereinafter referred to as "measurement macro"). The measurement macro sets the result of the measurement in a predetermined measurement result variable. Then, an operation management system acquires the measurement result by reading out the value of the measurement result variable from the numerical controller. Typically, the operation management system is an information processor such as a personal computer that operates according to operation management software.

Japanese Patent Application Laid-Open No. 2014-2654 discloses an example of a system in which a numerical controller controls a machine tool to perform measurements on workpieces.

Spots (measurement points) on a workpiece to be measured by a machine tool or measuring equipment and the number of measurement points generally vary depending on the type of the workpiece. In general, therefore, a measurement macro is separately created for each workpiece type. Thus, the operation management system should also be configured to read out a different measurement result variable for each measurement macro or workpiece type. In other words, the operation management system is expected to previously correctly ascertain the measurement result variable to be read out for each workpiece type.

In this regard, an operator conventionally manually sets the correspondence between the workpiece type and the measurement result variable in the operation management system. In doing this, the operator must correctly perform a setting operation according to the content of the measurement macro correctly understood in advance. This process requires a reasonable number of man-hours and the manual operation may possibly result in mistakes.

If processes for analyzing the content of the measurement macro and setting the operation management system based on the result of the analysis can be automated, measured data should be able to be collected more easily and correctly. Conventionally, however, no means has been provided for the automation.

SUMMARY OF THE INVENTION

The present invention has been made to solve the above problems, and its object is to provide an operation management system and a measurement system capable of easily acquiring the result of measurement of a workpiece from a numerical controller.

An operation management system according to one embodiment of the present invention is configured to acquire measured values of a workpiece from a numerical controller which controls a machine tool to measure the workpiece, and comprises a measurement macro receiving unit configured to read a measurement macro for controlling the measurement from the numerical controller, a measurement macro analysis unit configured to analyze the measurement macro to identify the name of a measurement result variable loaded with the measured values, and a measurement result read-out unit configured to read out the value of the measurement result variable from the numerical controller.

An operation management system according to another embodiment further comprises a saving unit, and the measurement macro analysis unit correspondingly saves the type of the workpiece and one or more measurement result variable names in the saving unit.

In an operation management system according to another embodiment, the measurement macro analysis unit identifies the type of the workpiece based on the name of a program being executed on the numerical controller.

In an operation management system according to another embodiment, the measurement result read-out unit reads out the value of the measurement result variable from the numerical controller as a trigger variable contained in the measurement macro is updated.

In an operation management system according to another embodiment, the measurement macro analysis unit analyzes the measurement macro to identify the name of the trigger variable.

In an operation management system according to another embodiment, the measurement macro analysis unit identifies the name of the measurement result variable based on a position on a line where the measurement result variable is described in the measurement macro.

In an operation management system according to another embodiment, the measurement macro analysis unit identifies the name of the measurement result variable based on the content of a comment described in the measurement macro.

An operation management system according to another embodiment comprises a numerical controller configured to control a machine tool to measure a workpiece and an operation management system configured to acquire measured values of the workpiece from the numerical controller, the operation management system comprising a measurement macro receiving unit configured to read a measurement macro for controlling the measurement from the numerical controller, a measurement macro analysis unit configured to analyze the measurement macro to identify the name of a measurement result variable loaded with the measured values, and a measurement result read-out unit configured to read out the value of the measurement result variable from the numerical controller.

According to the present invention, there can be provided an operation management system and a measurement system capable of easily acquiring the result of measurement of a workpiece from a numerical controller.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
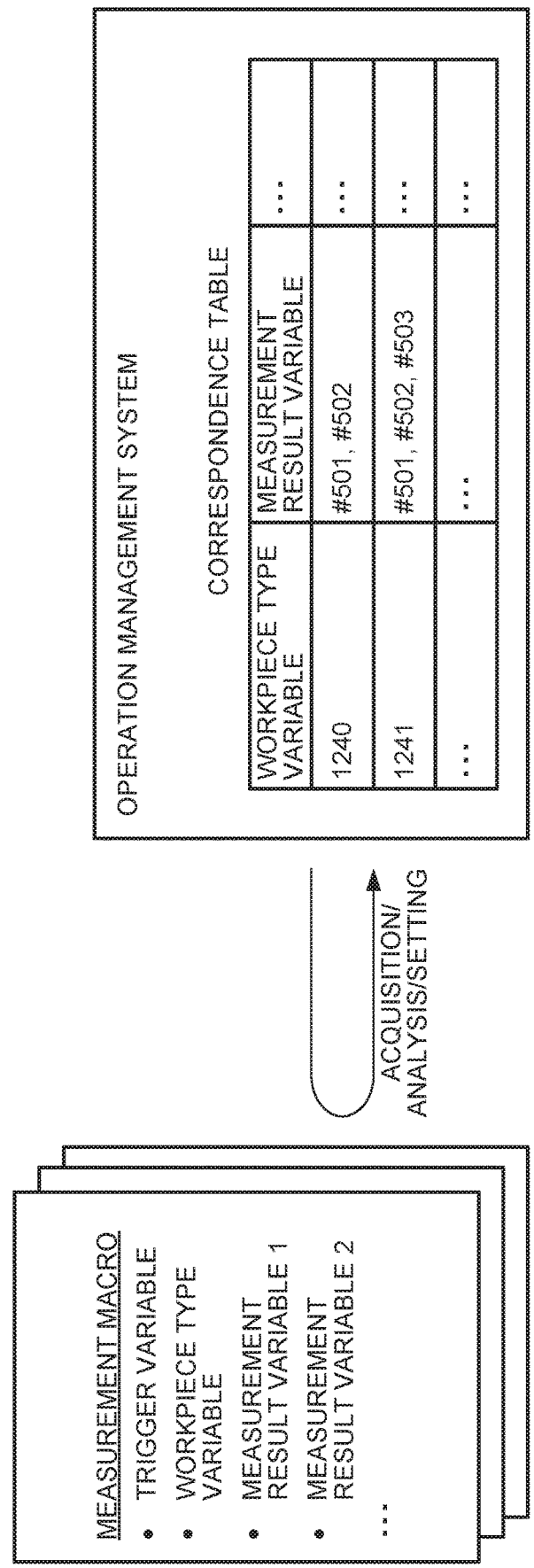
FIG. 1 is a diagram showing an outline of the present invention.

First, to facilitate understanding of the present invention, there will be described a series of processing procedures that an operation management system conventionally used to perform in order to acquire measurement results from a numerical controller. This series of procedures comprises two stages, advance preparation and measurement execution.

1. Advance Preparation

This is a stage in which an operator creates a measurement macro for each type of workpiece. The measurement macro generally uses the following macro variables.

(a) Workpiece Type Variables

These are variables with which the numerical controller sets the types of workpieces. The operation management system can obtain the type of a workpiece by reading the value of a workpiece type variable.

(b) Measurement Result Variables

These are variables with which the numerical controller sets the values of the measurement results. The number and type of the measurement results vary depending on the workpiece type.

(c) Trigger Variable

This is a variable with which the numerical controller notifies the operation management system that values are stored in the workpiece type variables and the measurement result variables. Typically, the numerical controller sets the trigger variable value to 1 when the values are set for the workpiece type variables and the measurement result variables. The operation management system monitors the trigger variable in advance and reads the values of the workpiece type variable when the value of the trigger variable becomes 1.

The operation management system previously keeps a correspondence table showing the relationships between the workpiece type variables and the numbers and types of the measurement result variables. The operation management system determines the number and type of the measurement result variables (i.e., variable name) to be read with reference to the correspondence table using the value of the workpiece type variable read from the numerical controller as a key. The operation management system reads out an appropriate measurement result variable value from the numerical controller. When the read-out of the measurement result variable value is completed, the value of the trigger variable is set to 0.

The measurement macro generally has the following construction.

(1) Step of setting the workpiece type in the workpiece type variable.

(2) Step of executing workpiece measurement and setting measured values in the measurement result variables.

(3) Step of changing the trigger variable value to 1.

(4) Step of waiting until the trigger variable value becomes 0.

The operator carries out an operation to set the correspondence between the workpiece type variables and the measurement result variables in the operation management system after understanding the content of the measurement macro. The operation management system keeps the set correspondence as the aforementioned correspondence table. In a typical correspondence table, the name or names of one or more measurement result variables are associated individually with one or more workpiece type variables.

2. Measurement Execution

This is a stage in which the numerical controller executes the measurement macro and the operation management system performs processing to acquire measured values. The operation management system generally performs the following processing.

(1) Step of regularly reading the value of the trigger variable and waiting until the value becomes 1.

(2) Step of reading the value of the workpiece type variable to identify the workpiece type when the trigger variable value becomes 1.

(3) Step of retrieving the correspondence table showing the workpiece type and measurement result variables using the workpiece type variable identified in Step (2) as a key to identify the measurement result variable to be read out.

(4) Step of reading out the value of the measurement result variable identified in Step (3).

(5) Step of restoring the trigger variable value to 0.

The above series of procedures is only an example and the content of the measurement macro and the step of measurement execution can be arranged in any other manner than aforesaid. For example, the program name of the measurement macro may be used as an identifier for identifying the workpiece type without using the workpiece type variable in the measurement macro (A). Moreover, the operation management system may be configured to monitor or regularly read the name of the program being executed on the numerical controller instead of monitoring the trigger variable (B).

In the case (A), the operator sets the correspondence between the program name of the measurement macro and the measurement result variable in the operation management system. Moreover, the measurement macro has the following construction.

(1) Step of executing workpiece measurement and setting measured values in the measurement result variables.

(2) Step of changing the trigger variable value to 1.

(3) Step of waiting until the trigger variable value becomes 0.

Moreover, the operation management system carries out the following processing in the case (A).

(1) Step of regularly reading the value of the trigger variable and waiting until the value becomes 1.

(2) Step of acquiring the name of the program being executed on the numerical controller to identify the workpiece type when the trigger variable value becomes 1.

(3) Step of retrieving the correspondence table showing the program name and measurement result variables using the program name identified in Step (2) as a key to identify the measurement result variable to be read out.

(4) Step of reading out the value of the measurement result variable identified in Step (3).

(5) Step of restoring the trigger variable value to 0.

In the case (B), the operator sets the correspondence between the program name of the measurement macro, trigger variable name, and measurement result variable name in the operation management system. Also in this case, the program name of the measurement macro is used to identify the workpiece type. The construction of the measurement macro to be used is the same as that for the aforesaid case (A).

Moreover, the operation management system carries out the following processing in the case (B).

(1) Step of regularly acquiring the name of the program being executed on the numerical controller and retrieving the correspondence table using the acquired program name as a key when the acquired value is changed. If the program name is registered in the correspondence table, the program concerned is the measurement macro. The trigger variable name and the measurement result variable name associated with the program name are acquired in this way.

(2) Step of regularly reading out the value of the trigger variable acquired in Step (1) and reading the value of the measurement result variable acquired in Step (1) when the value becomes 1.

(3) Step of restoring the trigger variable value to 0.

Thus, in the case (B), the trigger variable, as well as the measurement result variable, can be assumed to be a variable that varies for each measurement macro.

Conventionally, in either of the cases described above, it used to be necessary for the operator to previously set the measurement result variable to be read for each workpiece type in the operation management system. In general, the setting operation of this type is a manual operation. According to the present invention, in contrast, the operation management system analyzes the content of the measurement macro and sets the correspondence between the workpiece type and the measurement result variable by itself, based on the analyzed content. In this way, measurement data can be collected more easily and accurately than in conventional methods (see FIG. 1).

The following is a description of an outline of an operation management system according to an embodiment of the present invention.

Processing by the operation management system according to the embodiment of the present invention to acquire the measurement result from the numerical controller includes two stages, advance preparation and measurement execution.

First, in the advance preparation stage, the operation management system analyzes the content of the measurement macro created by the operator and performs processing for determining the correspondence between the workpiece type and macro variables such as the measurement result variables that should be read out. Moreover, it manages the determined correspondence as the correspondence table.

Subsequently, in the measurement execution stage, the operation management system identifies the type of workpiece measured by a machine tool, identifies the macro variables that should be read out based on the correspondence table, and performs processing for reading the values of these macro variables.

In order to determine the correspondence between the workpiece type and the measurement result variables and the like in the advance preparation stage, the operation management system should be able to determine the meaning of the macro variables used in the measurement macro (e.g., the macro variables used as the measurement result variables). The meaning of the macro variables can be determined by the following two methods.

($\alpha$) The meaning of the variables is determined based on positions on the line where the variables are placed in the measurement macro.

($\beta$) The meaning of the variables is determined based on the content of a comment described in the measurement macro.

The following is a specific description of the embodiments of the present invention, that is, Embodiment 1 based on the method ($\alpha$) and Embodiment 2 based on the method ($\beta$).

Embodiment 1

The configuration of an operation management system 10 according to Embodiment 1 of the present invention will now be described with reference to the block diagram of FIG. 2. The operation management system 10 according to Embodiment 1 comprises a measurement macro receiving unit 11, measurement macro analysis unit 12, measurement macro storage unit 13, reading condition monitoring unit 14, measurement result read-out unit 15, read completion write unit 16, saving unit 18, and communication unit 19. Typically, the operation management system 10 is an information processor comprising a central processing unit, storage device, input/output device, and the like. As the central processing unit reads out a program stored in the storage device and executes it, the above various processing parts are logically implemented.

The operation management system 10 is connected to a numerical controller 20 for communication. The numerical controller 20 comprises a measurement macro 21. The numerical controller 20 controls a machine tool (not shown) according to the measurement macro 21. A probe is mounted on the machine tool and serves to measure the dimensions of a machined workpiece, controlled by the numerical controller 20. The result of the measurement is set in a predetermined measurement result variable defined in the measurement macro 21. The operation management system 10 acquires the measurement result by reading out the value of the measurement result variable from the numerical controller 20. A system comprising the operation management system 10 and the numerical controller 20 will hereinafter be referred to as a measurement system 100 as a whole.

The constituent elements of the operation management system 10 will be further described. The measurement macro receiving unit 11 reads out and acquires the measurement macro 21 from the numerical controller 20.

The measurement macro analysis unit 12 analyzes the content of the measurement macro 21 acquired by the measurement macro receiving unit 11 and extracts macro variables such as a workpiece type variable, measurement result variable, and trigger variable.

The measurement macro storage unit 13 causes the saving unit 18 to correspondingly store the workpiece type variable extracted by the measurement macro analysis unit 12 and the macro variables (e.g., measurement result variable name) to be read by the operation management system 10. Alternatively, the measurement macro storage unit 13 may be configured to correspondingly store a macro program and macro variables (measurement result variable name, trigger variable name, etc.) to be read. This associated data set will hereinafter be referred to as a correspondence table. In a typical correspondence table, one or more measurement result variable names are associated individually with one or more workpiece type variables or program names.

The reading condition monitoring unit 14 acquires a workpiece type variable if the workpiece type variable is defined in the measurement macro 21 or acquires the name of the program being executed on the numerical controller 20 if not. Moreover, the reading condition monitoring unit 14 retrieves the correspondence table using the workpiece type variable or the program name being executed on the numerical controller 20 as a key and acquires one or more measurement result variables. Furthermore, the reading condition monitoring unit 14 monitors renewal of the trigger variable. Typically, the trigger variable is a variable defined in the measurement macro 21. The reading condition monitoring unit 14 monitors the trigger variable if its name is fixed. If one of different trigger variable names is defined for each measurement macro 21, the reading condition monitoring unit 14 retrieves the correspondence table stored in the measurement macro storage unit 13 using the name of the program being executed on the numerical controller 20 as a key. If there is any trigger variable associated with the program name, the reading condition monitoring unit 14 monitors the trigger variable. When the trigger variable on the numerical controller 20 is updated, or typically, when the trigger variable becomes 1, the reading condition monitoring unit 14 notifies the measurement result read-out unit 15 to that effect.

On receiving the notification from the reading condition monitoring unit 14, the measurement result read-out unit 15 communicates with the numerical controller 20 to read out a value set in the measurement result variable name acquired by the reading condition monitoring unit 14. The measurement result read-out unit 15 saves the read value as a measurement result in the saving unit 18.

When the measurement result is saved by the measurement result read-out unit 15, the read completion write unit 16 updates the trigger variable. Typically, the trigger variable value is restored to 0.

The saving unit 18 is a storage area that saves the correspondence table and the measurement result. The communication unit 19 controls the communication between the operation management system 10 and the numerical controller 20.

Processing for collecting the measured values by the operation management system 10 according to Embodiment 1 will now be described sequentially.

1. Advance Preparation

The numerical controller 20 stores the measurement macro 21 created by the operator. The measurement macro 21 contains a trigger variable, measurement result variable, and if necessary, workpiece type variable. As described in the explanation of the prior art, the measurement macro 21 can be created in some methods. In the present embodiment, the measurement macro 21 is assumed to be created by the method illustrated as Prior Art (B).

Thus, the measurement macro 21 contains no workpiece type variable. Moreover, one of different trigger variable names can be defined for each measurement macro 21. In the correspondence table described later, therefore, the program name, trigger variable name, and measurement result variable name should be associated with one another.

Figure 3:
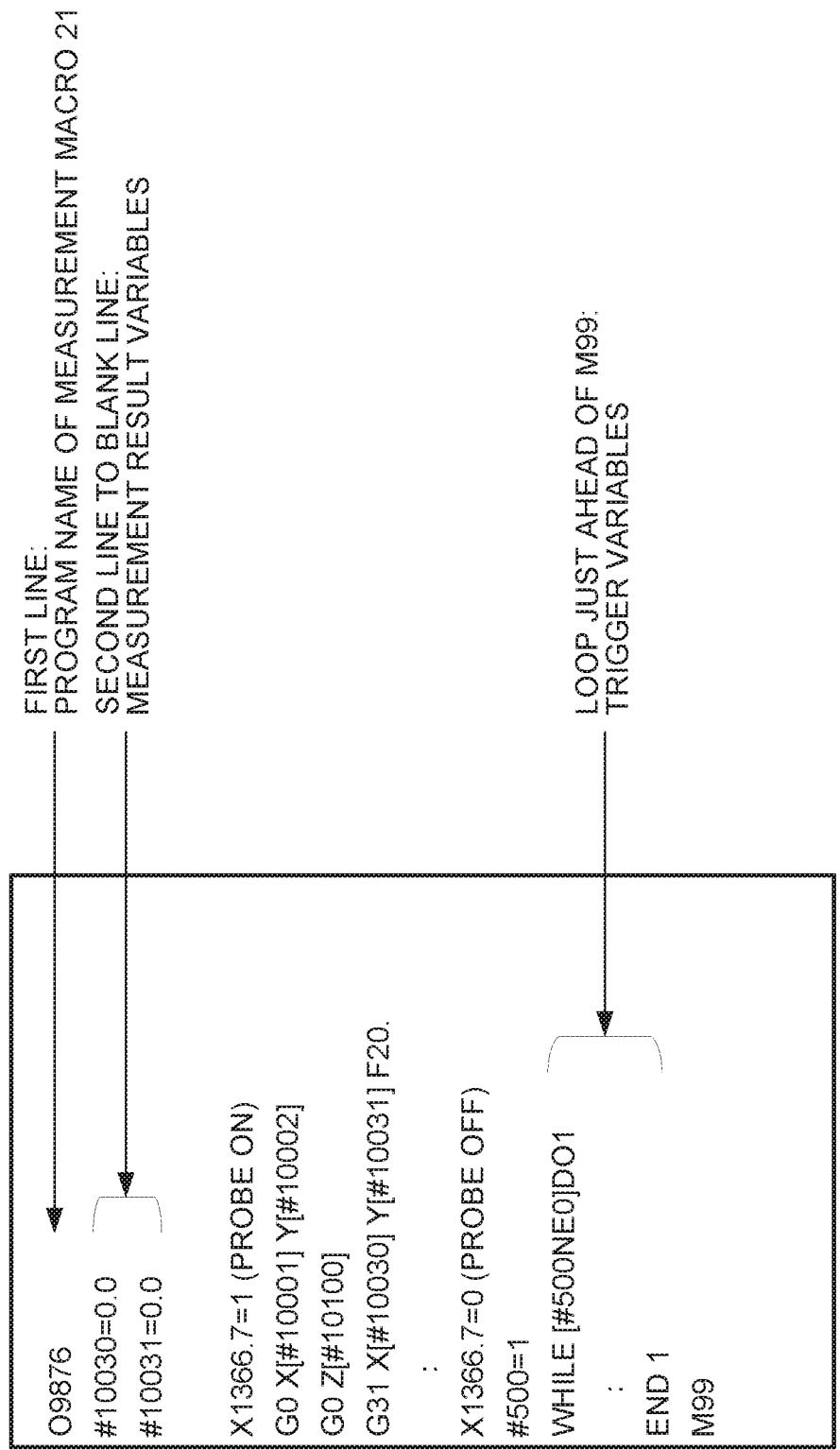
FIG. 3 is a diagram showing an example of a measurement macro according to Embodiment 1 of the present invention.

FIG. 3 shows an example of the measurement macro 21 according to Embodiment 1. In the present embodiment, as already described above, the meaning of the variables is determined based on positions on the line where the variables are placed in the measurement macro 21. The operator is expected to create the measurement macro 21 according to the following rules in the numerical controller 20.

(i) The program name of the measurement macro 21 is assumed to be on the first line. This also functions as an identifier for identifying the workpiece type. In the example of FIG. 3, "O9876" is the program name of the measurement macro 21.

(ii) Lines ranging from the second line to a blank line are assumed to constitute a block for initializing measurement result variables. Macro variables described in this block are measurement result variables. A plurality of measurement result variables can be entered. In the example of FIG. 3, "#10030" and "#10031" are the names of the measurement result variables.

(iii) A sequence for a handshake with the operation management system 10 is assumed to be described in a loop just ahead of M99. A variable that is checked to see if its value at the top of the loop is the trigger variable. In the example of FIG. 3, "#500NE0" is equivalent to the check of the value at the top of the loop. Thus, the trigger variable name is "#500".

Codes for controlling the machine tool to execute measurements are described in a block between (ii) and (iii).

Figure 4:
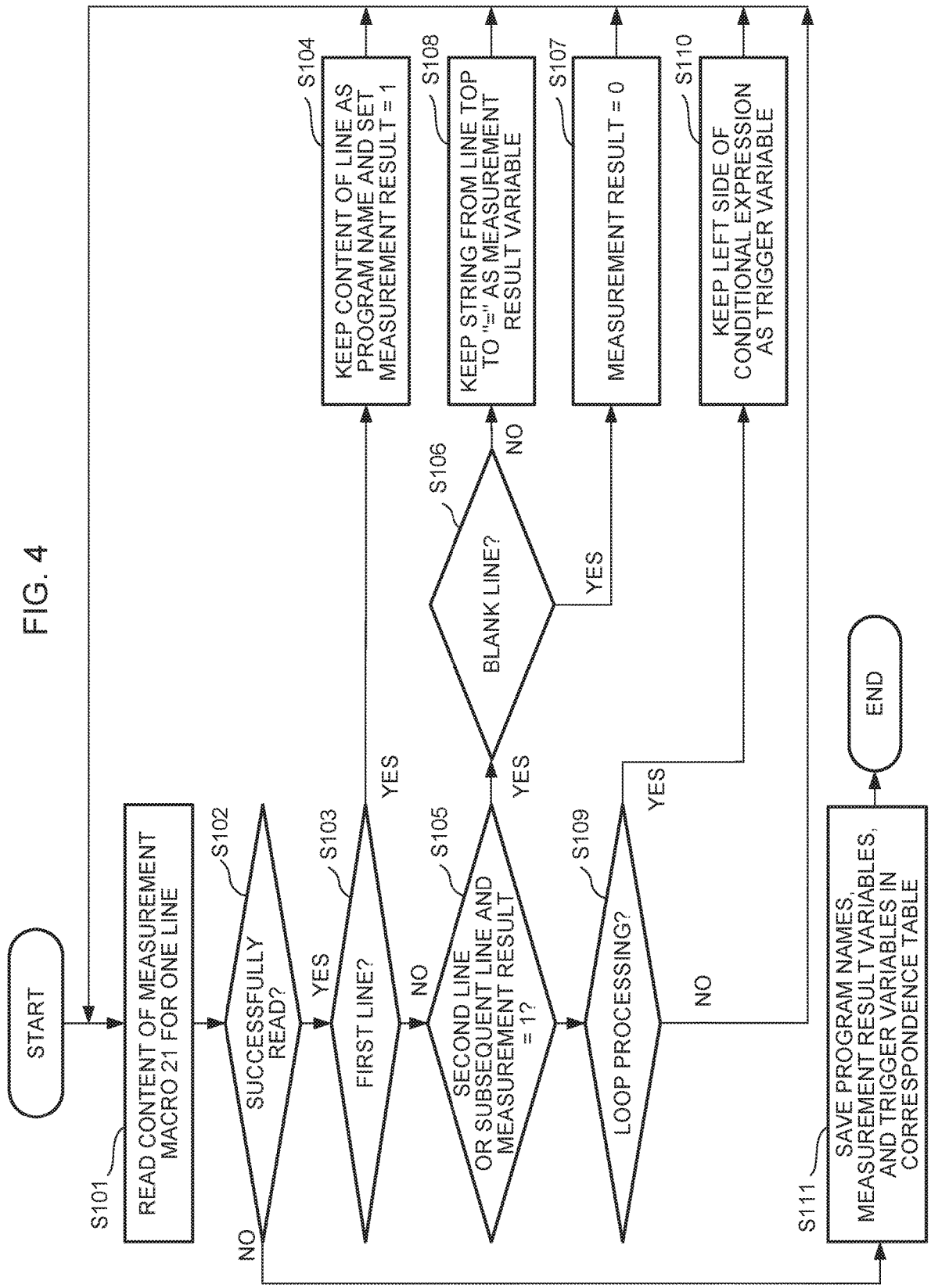
FIG. 4 is a diagram showing the operation of the operation management system 10 according to Embodiment 1 of the present invention.

Then, the operation management system 10 communicates with the numerical controller 20 to read out the measurement macro 21 and analyzes its content. Analysis processing for the measurement macro 21 by the operation management system 10 will now be described with reference to the flowchart of FIG. 4.

First, the measurement macro receiving unit 11 receives the measurement macro 21 from the numerical controller 20. Although there are no special restrictions on the method of reception, FTP (file transfer protocol) and communication protocols peculiar to the numerical controller 20 can be used for the reception. Then, the measurement macro analysis unit 12 analyzes the measurement macro 21 in the following procedures.

S101:

The measurement macro analysis unit 12 reads the received measurement macro 21 line by line.

S102:

If the reading is successfully achieved, the processing proceeds to S103. If not, it is assumed that the reading to the last line is completed, whereupon the processing proceeds to S111.

S103:

If the read line is the first line, the processing proceeds to S104. If not, the processing proceeds to S105.

S104:

The measurement macro analysis unit 12 reads the content of the first line and keeps it as the program name. Moreover, it sets a measurement result flag to 1. The measurement result flag is a flag that indicates that extraction of the measurement result variable is currently being executed. The processing proceeds to S101, in which the next line is read.

S105:

If the read line is the second line or any subsequent line and if the measurement result flag is 1, the processing proceeds to S106 to extract the measurement result variable name. If not, it is assumed that the extraction of the measurement result variable name is completed, whereupon the processing proceeds to S109.

S106:

If the read line is the blank line, the processing proceeds to S107. If not, the processing proceeds to S108.

S107:

The measurement macro analysis unit 12 sets the measurement result flag to 0. Thereafter, the processing proceeds to S101, in which the next line is read.

S108:

The measurement macro analysis unit 12 extracts a character string ranging from the top of the line to a character just ahead of "=" and keeps it as the measurement result variable. Thereafter, the processing proceeds to S101, in which the next line is read.

S109:

If the read line is loop processing (e.g., including "WHILE"), the processing proceeds to S110. If not, the processing proceeds to S101, in which the next line is read.

S110:

The measurement macro analysis unit 12 extracts the left side from a conditional expression for the loop processing and keeps it as the trigger variable. Thereafter, the processing proceeds to S101, in which the next line is read.

Figures 5, 6:
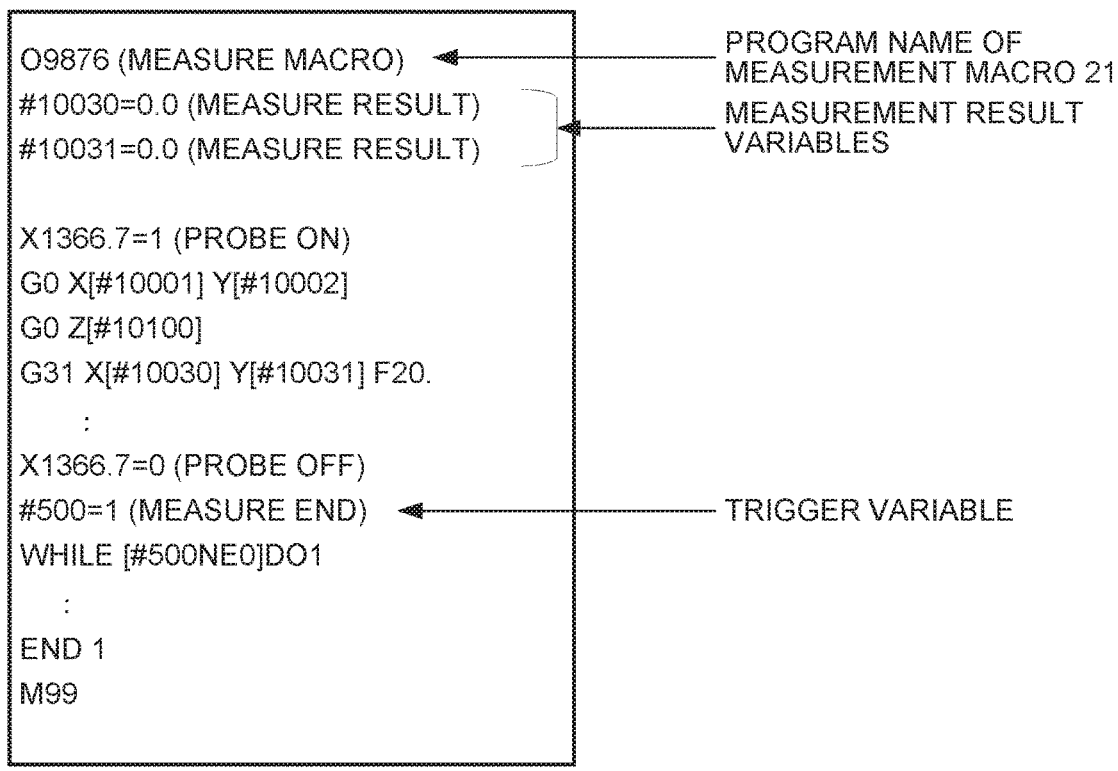
FIG. 5 is a diagram showing an example of a correspondence table in Embodiments 1 and 2 of the present invention.
FIG. 6 is a diagram showing an example of a measurement macro according to Embodiment 2 of the present invention.

S111:

The measurement macro storage unit 13 correspondingly saves the measurement result variable names and trigger variable names as the correspondence table in the saving unit 18, using the program names so far extracted as keys. FIG. 5 shows an example of the correspondence table. In the example of FIG. 5, different trigger variable names and a plurality of measurement result variable names are associated individually with one another for each program name.

2. Measurement Execution

Subsequently, the operation of the operation management system 10 during the measurement execution will be described with reference to the flowchart of FIG. 8.

S301:

The reading condition monitoring unit 14 communicates with the numerical controller 20 to check to see if there is any program being executed on the numerical controller 20. If any program is being executed, the processing proceeds to S302. If not, the processing proceeds to S301.

S302.

The reading condition monitoring unit 14 acquires the name of the program being executed on the numerical controller 20.

S303:

The reading condition monitoring unit 14 determines whether or not the name of the running program acquired in S302 is different from the program name acquired in the previous loop. If the running program name is different from the previous program name or if the previous program name is not stored, the processing proceeds to S304. If not, the processing returns to S301.

S304:

The reading condition monitoring unit 14 retrieves the correspondence table in the saving unit 18 using the program name acquired in S302 as a key.

S305:

If the program name is present in the correspondence table, it is assumed to be the name of a measurement macro, that is, an identifier that can identify the workpiece type, whereupon the processing proceeds to S306. If not, the processing returns to S301.

S306:

The reading condition monitoring unit 14 acquires the measurement result variable name and the trigger variable name associated with the program name with reference to the correspondence table in the saving unit 18.

S307 and S308:

The reading condition monitoring unit 14 communicates with the numerical controller 20 to regularly read the trigger variable value acquired in S306. When the numerical controller 20 ends the measurement, the trigger variable value is updated from 0 to 1. When the reading condition monitoring unit 14 detects that the trigger variable value is updated to 1, the processing proceeds to S309.

S309:

The measurement result read-out unit 15 communicates with the numerical controller 20 to read the measurement result variable value acquired in S306 and saves it in the saving unit 18.

S310:

The read completion write unit 16 communicates with the numerical controller 20, in order to notify the numerical controller 20 that the read-out of the measurement result is completed, and updates the trigger variable value to 0. Thereafter, the processing returns to S301.

Embodiment 2

Figure 2:
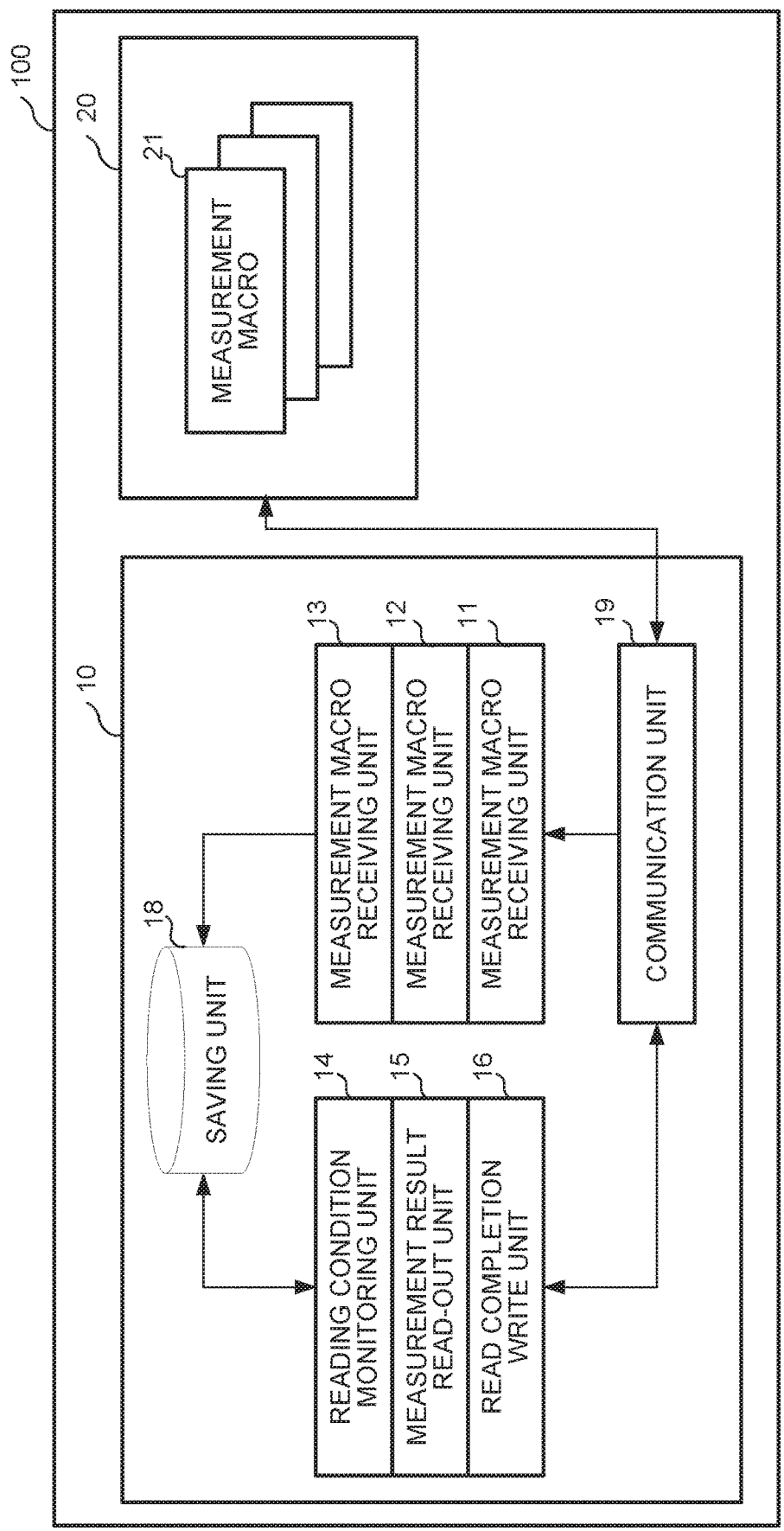
FIG. 2 is a diagram showing the configuration of each of operation management systems according to Embodiments 1 and 2 of the present invention.

Since the configuration of an operation management system 10 according to Embodiment 2 is the same as that of Embodiment 1, a description thereof will be omitted (see FIG. 2). Processing for collecting the measured values by the operation management system 10 according to Embodiment 2 will now be described sequentially.

1. Advance Preparation

FIG. 6 shows an example of a measurement macro 21 according to Embodiment 2. In the present embodiment, as already described above, the meaning of variables is determined based on the content of a comment described in the measurement macro 21. The operator is expected to create the measurement macro 21 with the appended comment according to the following rules in a numerical controller 20.

(i) The program name of the measurement macro 21 is described together with a predetermined comment that indicates that the program name is on the line concerned. In the example of FIG. 6, a comment "MEASURE MACRO" is described following the program name "O9876" of the measurement macro 21 on the first line.

(ii) A predetermined comment is described on a line for setting a value for the measurement result variable. In the example of FIG. 6, macro variables "#10030" and "#10031" are initialized on the second and third lines, and a comment "MEASURE RESULT" is added to each line end. If there is a plurality of measurement result variables, a comment for identification may be added to each of them.

(iii) A predetermined comment is described on a line for setting a value for the trigger variable. In the example of FIG. 6, a comment "MEASURE END" is added to the end of a line "#500=1".

Figure 7:
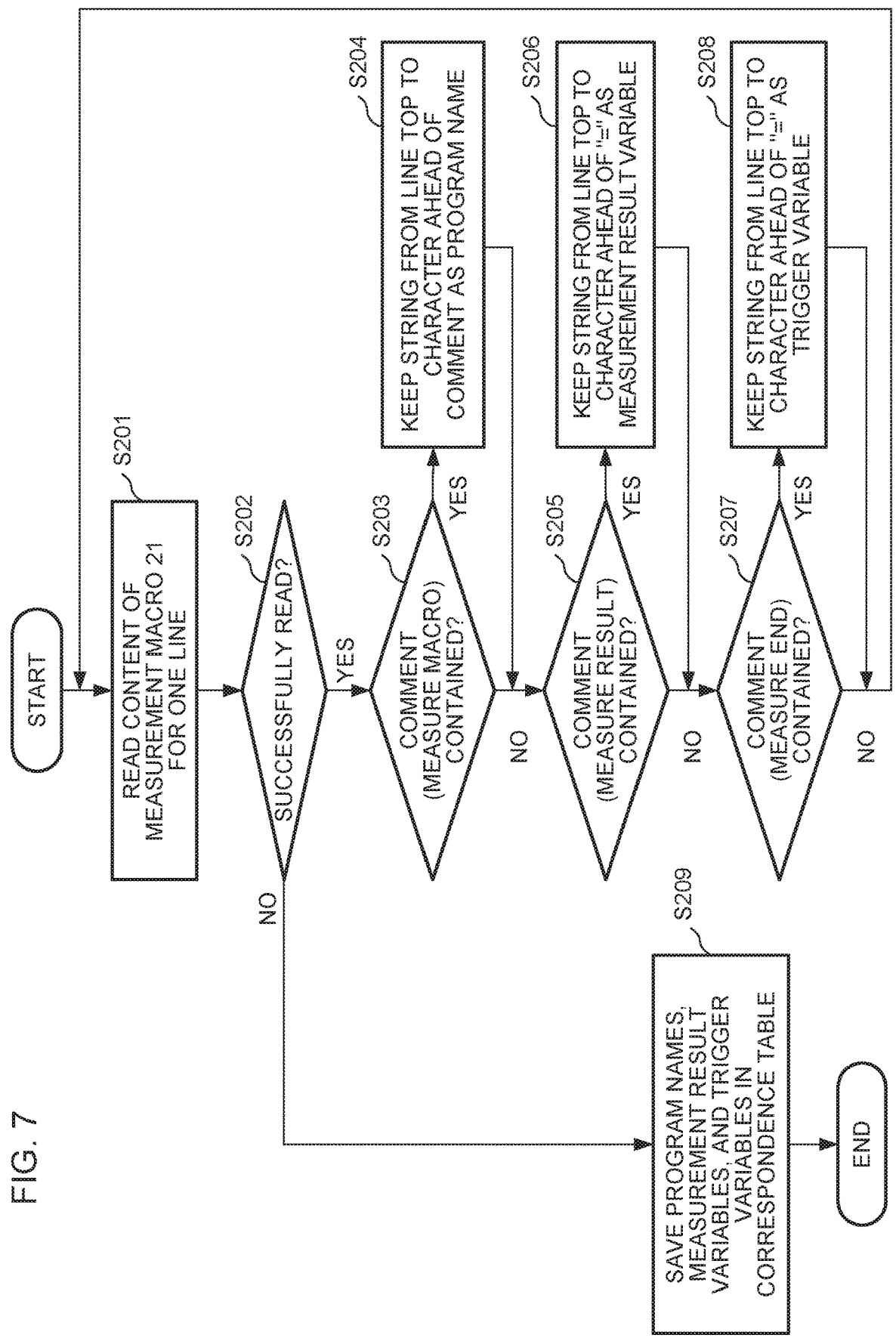
FIG. 7 is a diagram showing the operation of the operation management system 10 according to Embodiment 2 of the present invention.

Then, the operation management system 10 communicates with the numerical controller 20 to read out the measurement macro 21 and analyzes its content. Analysis processing for the measurement macro 21 by the operation management system 10 will now be described with reference to the flowchart of FIG. 7.

First, a measurement macro receiving unit 11 receives the measurement macro 21 from the numerical controller 20. Then, a measurement macro analysis unit 12 analyzes the measurement macro 21 in the following procedures.

S201:
The measurement macro analysis unit 12 reads the received measurement macro 21 line by line.

S202:
If the reading is successfully achieved, the processing proceeds to S203. If not, it is assumed that the reading to the last line is completed, whereupon the processing proceeds to S209.

S203 and S204:
The measurement macro analysis unit 12 determines whether or not a predetermined comment ("MEASURE MACRO" in the example of FIG. 3) that indicates that the line concerned contains the program name is contained in the lines read in S201. If the comment is contained, the measurement macro analysis unit 12 extracts a character string ranging from the top of the line to a character just ahead of the comment as the program name.

S205 to S206:
If a predetermined comment ("MEASURE RESULT" in the example of FIG. 3) that indicates that the line concerned contains the measurement result variable name is contained in the lines read in S201, the measurement macro analysis unit 12 extracts a character string ranging from the top of the line to a character just ahead of "=" as the measurement result variable name.

S207 to S208:
If a predetermined comment ("MEASURE END" in the example of FIG. 3) that indicates that the line concerned means the trigger variable name is contained in the lines read in S201, the measurement macro analysis unit 12 extracts a character string ranging from the top of the line to a character just ahead of "=" as the trigger variable name.

S209:
A measurement macro storage unit 13 correspondingly saves the measurement result variable name and the trigger variable name as a correspondence table in a saving unit 18, using the program names so far extracted as keys. FIG. 5 shows an example of the correspondence table.

2. Measurement Execution

Figure 8:
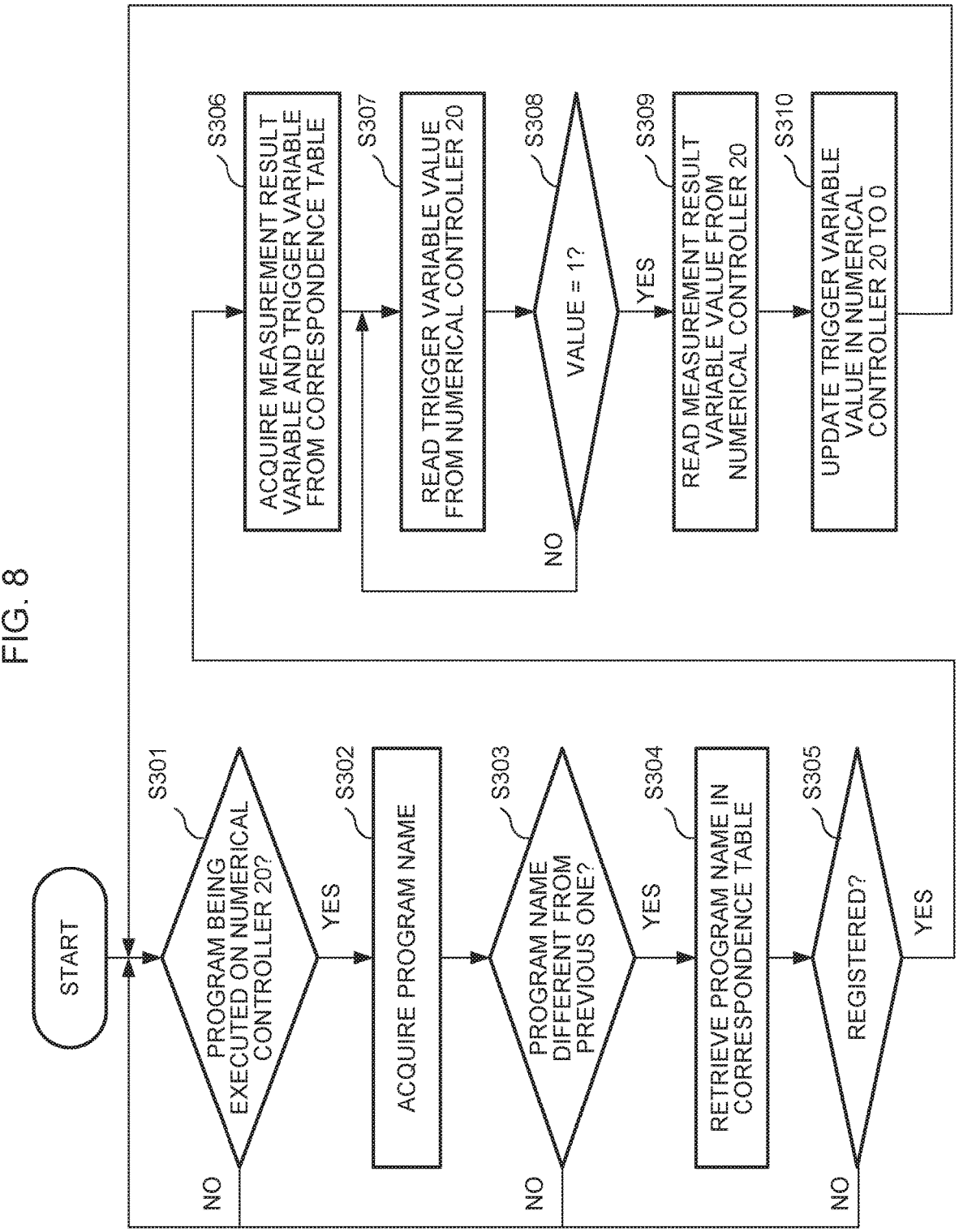
FIG. 8 is a diagram showing the operation of each of the operation management systems 10 according to Embodiments 1 and 2 of the present invention.

Also in Embodiment 2, the operation of the operation management system 10 during the measurement execution is the same as that of Embodiment 1, so that a description thereof will be omitted (see FIG. 8).

According to the various embodiments described above, the operation management system 10 analyzes the measurement macro 21 and identifies macro variable names (measurement result variable name, trigger variable name, etc.) to be read in accordance with the workpiece type. Thus, the measured values of the workpiece can be acquired easily and accurately from the numerical controller 20.

The present invention is not limited to the above-described embodiments and may be suitably changed without departing from the spirit of the invention. Any of the constituent elements of the embodiments may be modified or omitted without departing from the scope of the present invention.

In the configurations shown in connection with Embodiments 1 and 2 described above, for example, the trigger variable name and the measurement result variable name can be arbitrarily defined for each workpiece type (more specifically, program name of the measurement macro 21). For example, however, some of the trigger variable names and measurement result variable names may be fixed so that specific steps of these macro variables can be omitted. In this case, the fixed macro variable names may be excluded from the correspondence table.

Moreover, in the examples shown in connection with Embodiments 1 and 2 described above, the operation management system 10 analyzes the measurement macro 21 by (a) determining the meaning of the variables based on positions on the line where the variables are placed in the measurement macro 21 or by (b) determining the meaning of the variables based on the content of the comment described in the measurement macro 21. However, the analysis of the measurement macro 21 is not limited to these methods. The measurement macro 21 may be analyzed using any information that is described in the measurement macro 21, provided that the information is not against a prescribed grammar of the measurement macro 21 and can be read by the operation management system 10. For example, the macro variables appearing in the measurement macro 21 can be classified into workpiece type variables, trigger variables, or measurement result variables, based on predetermined naming rules for the macro variable names.

While embodiments of the present invention have been described herein, the invention is not limited to the above-described embodiments and may be suitably modified and embodied in various forms.

The invention claimed is:

1. An operation management system configured to acquire measured values of a workpiece from a numerical controller which controls a machine tool to measure the workpiece, the operation management system comprising:
a processor configure to
read a measurement macro for controlling the measurement from the numerical controller,
analyze the measurement macro to identify the name of a measurement result variable loaded with the measured values, and
read out the value of the measurement result variable from the numerical controller, wherein the processor is configured to read out the value of the measurement result variable from the numerical controller in response to a detection that a trigger variable defined for the measurement macro is updated.

2. The operation management system according to claim 1, further comprising
at least one memory configured to save the type of the workpiece and one or more said measurement result variable names.

3. The operation management system according to claim 2, wherein the processor is configured to
identify the type of the workpiece based on the name of a program being executed on the numerical controller.

4. The operation management system according to claim 1, wherein the processor is configured to analyze the measurement macro to identify the name of the trigger variable.

5. The operation management system according to claim 1, wherein the processor is configured to
identify the name of the measurement result variable based on a position on a line where the measurement result variable is described in the measurement macro.

6. The operation management system according to claim 1, wherein the processor is configured to
identify the name of the measurement result variable based on the content of a comment described in the measurement macro.

7. A measurement system, comprising:
a numerical controller configured to control a machine tool to measure a workpiece; and
an operation management system configured to acquire measured values of the workpiece from the numerical controller,
the operation management system comprising a processor configure to
read a measurement macro for controlling the measurement from the numerical controller,
analyze the measurement macro to identify the name of a measurement result variable loaded with the measured values, and
read out the value of the measurement result variable from the numerical controller, wherein the processor is configured to read out the value of the measurement result variable from the numerical controller in response to a detection that a trigger variable defined for the measurement macro is updated.

* * * * *